United States Patent
Hansen

(10) Patent No.: US 7,658,351 B2
(45) Date of Patent: Feb. 9, 2010

(54) METHOD, SYSTEM AND APPARATUS FOR GUIDING AND SUPPORTING AN ELONGATED FLEXIBLE MEMBER

(76) Inventor: Kris Edward Hansen, 1620 15th St., Anacortes, WA (US) 98221

( * ) Notice: Subject to any disclaimer, the term of this patent is extended or adjusted under 35 U.S.C. 154(b) by 0 days.

(21) Appl. No.: 10/728,841

(22) Filed: Dec. 8, 2003

(65) Prior Publication Data

US 2004/0079842 A1 Apr. 29, 2004

Related U.S. Application Data

(62) Division of application No. 09/998,239, filed on Dec. 3, 2001, now Pat. No. 6,666,415.

(60) Provisional application No. 60/250,352, filed on Dec. 1, 2000, provisional application No. 60/284,526, filed on Apr. 19, 2001.

(51) Int. Cl.
  *F16L 3/12* (2006.01)
  *B66D 3/04* (2006.01)
(52) U.S. Cl. ............... 248/74.3; 248/65; 254/134.3 FT; 254/389
(58) Field of Classification Search ............ 248/62, 248/74.1, 74.2, 74.3, 68.1, 65, 49, 60, 66, 248/70; 24/16 PB, 17 AP; 242/397, 397.1, 242/397.5, 129.5, 151; 174/49, 65 G; 254/334, 254/337, 280, 134, 134.3 FT, 388, 389, 390, 254/415; 285/319, 349; 138/109, 121, 118, 138/120
See application file for complete search history.

(56) References Cited

U.S. PATENT DOCUMENTS

| | | | | |
|---|---|---|---|---|
| 683,312 A | * | 9/1901 | Marquardt | 285/145.5 |
| 767,893 A | * | 8/1904 | Jewell | 285/243 |
| 2,310,622 A | | 2/1943 | Ellinwood | |
| 2,408,572 A | | 10/1946 | Morehouse | |
| 2,409,772 A | | 10/1946 | Lund | |
| 3,460,788 A | * | 8/1969 | Goldman | 248/74.3 |
| 3,815,855 A | | 6/1974 | Appleton | |
| 3,838,713 A | * | 10/1974 | Tubbs | 138/109 |
| 3,848,839 A | | 11/1974 | Tillman | |
| 3,941,412 A | * | 3/1976 | Carpenter | 294/74 |

(Continued)

FOREIGN PATENT DOCUMENTS

GB 2124289 2/1984

*Primary Examiner*—Amy J Sterling
*Assistant Examiner*—Tan Le
(74) *Attorney, Agent, or Firm*—Banner & Witcoff, Ltd.

(57) ABSTRACT

The present invention relates to a member for guiding and supporting elongated flexible members such as wires, cables and other flexible lines that can introduce services and utilities into a residential, commercial or similar building structures. The guiding and support members receive and support at least one of the elongated flexible members so that it can be pulled around a corner without being damaged. Additionally, the guiding and support members can be used when the elongated member is only being pulled in a straight run or to organize elongated members that have already been run. Sweeps, including roller sweeps and cradles, can be secured to the guiding and supporting members to maintain a predetermined radius in the flexible members and reduce the amount of friction on the flexible member as it is pulled. This reduction in friction results in a smoother pull of the flexible member and a reduction in the amount of force needed to pull the flexible member.

3 Claims, 11 Drawing Sheets

U.S. PATENT DOCUMENTS

| | | |
|---|---|---|
| 4,011,397 A | 3/1977 | Bouche |
| 4,068,705 A * | 1/1978 | Cofer et al. .................. 164/417 |
| 4,128,220 A | 12/1978 | McNeel |
| 4,248,459 A * | 2/1981 | Pate et al. .................... 285/319 |
| 4,259,066 A * | 3/1981 | Pietschmann ................ 433/78 |
| 4,260,119 A * | 4/1981 | Price ...................... 242/157 R |
| 4,260,123 A | 4/1981 | Ismert |
| 4,300,738 A | 11/1981 | Whinfrey |
| 4,442,994 A | 4/1984 | Logsdon |
| 4,529,171 A * | 7/1985 | Woodruff ............ 254/134.3 FT |
| 4,669,145 A * | 6/1987 | Kehr .......................... 254/415 |
| 4,795,108 A * | 1/1989 | Appling ................... 242/157.1 |
| 5,007,605 A | 4/1991 | Horvath |
| 5,261,633 A | 11/1993 | Mastro |
| 5,377,940 A | 1/1995 | Cabe et al. |
| 5,577,772 A * | 11/1996 | Kaiser ....................... 280/838 |
| 5,739,474 A | 4/1998 | Bradley |
| 5,873,522 A | 2/1999 | Roberts |
| 5,950,970 A * | 9/1999 | Methany et al. ............. 248/150 |
| 5,961,081 A | 10/1999 | Rinderer |
| 6,032,907 A | 3/2000 | Santa Cruz et al. |
| 6,056,245 A * | 5/2000 | White ......................... 248/58 |
| 6,073,891 A | 6/2000 | Humber |
| 6,135,398 A * | 10/2000 | Quesnel .................... 248/74.1 |
| 6,164,604 A | 12/2000 | Cirino et al. |
| 6,467,734 B1 * | 10/2002 | Brown et al. .................. 248/65 |
| 6,666,415 B2 * | 12/2003 | Hansen ..................... 248/74.3 |
| 6,792,646 B1 * | 9/2004 | Greene et al. .............. 15/340.1 |

* cited by examiner

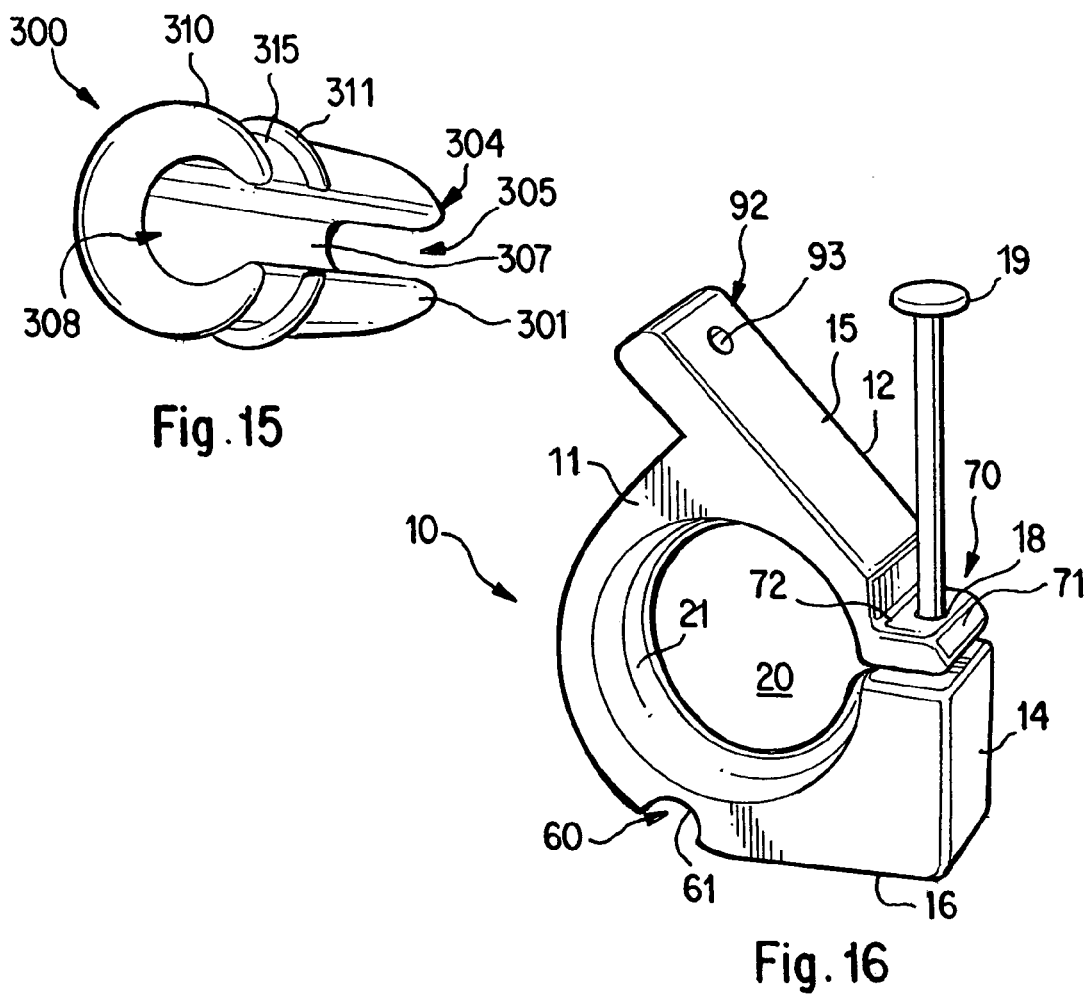
Fig. 15
Fig. 16
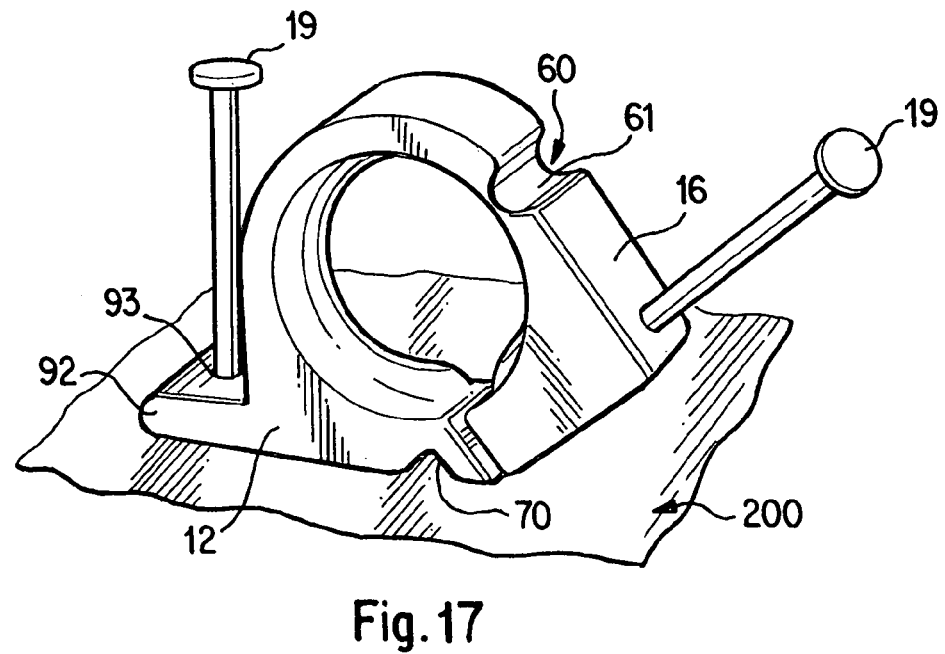
Fig. 17

METHOD, SYSTEM AND APPARATUS FOR GUIDING AND SUPPORTING AN ELONGATED FLEXIBLE MEMBER

This application is a divisional of U.S. application Ser. No. 09/998,239, filed Dec. 3, 2001, now allowed, which claims the benefit and priority of Provisional U.S. application Ser. No. 60/250,352 filed on Dec. 1, 2000, and of Provisional U.S. application Ser. No. 60/284,526, filed Apr. 19, 2001, the full disclosures of which are incorporated herein by reference.

The present invention relates to a method and apparatus for guiding, supporting and organizing an elongated flexible member during or after its installation, and for supporting the elongated member after its installation in order to prevent the flexible member from experiencing an improper bend radius. More specifically, the present invention relates to a member that can be secured to a vertical or horizontal support structure for guiding, organizing and supporting an elongated flexible member so that the elongated flexible member will not be damaged as it is pulled through or along a building structure during its installation and after it has been installed.

BACKGROUND OF THE INVENTION

The building industry uses a number of flexible members, such as cables, wires and flexible tubes, for providing utilities and services to a building. For example, wires and cables, including inner-duct and fiber optic cables, are used to bring electricity, television, telephone, data, Internet and other well-known services into a building or other known location. Additionally, gas, water and other types of fluids can be brought into the building using flexible tubes. These buildings can include residential, commercial and industrial structures.

During the construction of these buildings, the wires and other flexible members are pulled and positioned along or within the walls, ceilings and/or floors before the framing or wall supports are covered by drywall or other similar wallboards. Many times, the flexible members must be pulled around multiple corners during their installation. This can require that a workman be positioned at each and every corner to feed the flexible member around the corner. This is often impractical because of the number of people on an installation crew can be less than the number of corners that one of these flexible members will extend around. When personnel are not available to be at each corner (pull point), the person installing the flexible member must pull an extra length of the flexible member at the corner and form figure-eight's on the floor with the extra flexible member. After enough is gathered, the person will pull the gathered length along the path to the intended location or to one side of another corner and repeat the procedure. If the amount gathered at a corner is not enough to reach the intended point, the person must again go back to the first corner, gather more of the flexible member and repeat the time consuming and laborious process. This must be done for every corner that the flexible member is being positioned around. As a result, each time the person installing the flexible member needs to move the wire, he must go back to each and every corner and gather an amount of the flexible member there before pulling it to the next corner. This is a very time consuming process that can significantly delay the amount of time needed to wire or install the flexible members.

If an installer attempts to pull the flexible member an extended distance and/or around a corner, the flexible member will likely be physically damaged. Such a damaged flexible member could have kinks, nicks and/or cuts in its outer jacket and its inner core, along with internal damage caused by over stretching the core of the flexible member beyond an allowable limit during the application of the excessive tension and pull forces needed to pull the cable along the excessive length. Therefore, it follows that the more corners that the flexible member is extended over and the longer the distance of the pull, the more difficult it will be to pull the elongated member, the greater the magnitude of the force needed to pull the flexible member and the more damage that can result during the pull.

U.S. Pat. No. 4,442,994 to Logsdon discloses a plumbing pipe hanger that is secured to a wall by a nail inserted into an opening in the hanger. The pipe hanger receives and supports rigid plumbing pipes in an opening that has a slightly larger diameter than the pipe that it receives. This hanger is used in place of "plumber's tape." This hanger is only used to support rigid pipes. As a result, its interior wall has a plurality of projections that extend toward the center of the opening. These projections can trap and damage cables or wires positioned within or pulled through the pipe hanger. Additionally, the pipe hanger includes sharp lateral edges that would not permit a wire, cable or other flexible member to be pulled through it without possibly being damaged. Additionally, it is unlikely that the pipe hanger would be approved under proposed U.L. Standard #2239 4.1.1 that requires rounded and smooth surfaces on hardware in contact with an insulated conductor. As is well known, damage to a wire or flexible gas line can jeopardize lives because of the real potential for electrocution, fires or asphyxiation. Additionally, damage to these flexible members can ruin their performance and require that the entire length be rerun, thereby increasing the time and cost of the job.

Additionally, newly announced and existing standards for minimum installation requirements must be adhered to when any or all of the above mentioned flexible members are pulled and/or installed along a portion of a structure or building. One example of the newly announced standards in the telecommunication installation industry resides in TIA/EIA-568-B.1. This standard sets forth a minimum bend radius for a four-pair UTP cable under no-load conditions. This bend radius standard impacts small commercial and residential CAT 5 or CAT 6 installations due to a lack of appropriate hardware to facilitate compliance with the required minimum bend radii. For example, the pipe hanger disclosed U.S. Pat. No. 4,442,994, conventional J-hooks and bridle rings do not provide the support needed to achieve and maintain the flexible members at these minimum bend radii. Similarly, they cannot provide effective, practical support to most high performance telecommunication cables at their load and no-load minimum bend radius requirements and, as a result, do not provide effective cable management. As is known in the art, tighter bends in cables (minimum bend radii violations) can change the relationship of the pairs in the cable, degrade the transmission properties of the cable, reduce network performance and make it difficult to isolate the source of a problem within the network. These and other prior art hangers do not include members that can guide and support flexible members so that existing, as well as proposed, standards are met. Additionally, the prior art devices cannot be easily and quickly adapted for meeting different standards in multiple regions. For example, a hanger that may be used in one region may not be useable in another region because it cannot be easily and acceptably altered to meet the standards of this second region.

A need exists in the art for members that individually or as part of a system provide a controlled pull path that is free of obstructions, that supports the flexible member as it is pulled and after it is installed, that reduces the amount of needed pull force so that a smooth pull is achieved and that meet codes.

SUMMARY OF THE INVENTION

An aspect of the present invention relates to a member that alone or as part of a system guides and supports elongated flexible members such as wires, cables and other flexible lines that can introduce services and utilities into a residential, commercial, industrial or similar building structures. The guiding and support members according to the present invention receive and support at least one of the elongated flexible members so that it can be pulled around a corner and along a length without being damaged. Additionally, the guiding and support members can be used when the elongated member is only being pulled in a straight run or to organize elongated members that have already been run. Furthermore, the members can be used to support the flexible members after they have been hung in order to keep them at a required bend radius.

Each guide and support member can receive one or more wires within a central aperture so that the wire can be easily, quickly and safely pulled around corners and along the length of a wall, ceiling, cabinet or floor. The aperture in each guide and support member extends between first and second outer walls and has a smooth, rounded, convex surface located between these walls. The rounded profile of the convex surface permits wires and/or other flexible members to easily slide through it. These guides and support members also organize the wires, cables, etc.

A guide and support member according to the present invention (referred to as a "guide") comprises first and second side faces and at least one aperture extending between the first and second side faces. The aperture is defined by an inner circumferential surface extending between the faces and forming a passageway for receiving the at least one elongated member. The inner circumferential surface is convexly curved in a direction of the center of the aperture. The member also includes at least one elongated foot that extends along a first portion of an outer sidewall for orienting and positioning the guide on a structure.

Another aspect of the present invention includes a method for guiding an elongated flexible member around a corner. The method includes the steps of securing a guiding and supporting member proximate a corner; introducing the elongated member into an aperture in the guiding and supporting member and pulling the elongated member around the corner. It is possible that the aperture includes a groove with an open top, a closed opening with a hinged entry path or an opening that is only open in the direction that the elongated member is being fed.

An additional aspect of the present invention relates to another guiding and supporting member (referred to as a "sweep") that can be used with the other guide and support members to maintain a flexible member at a predetermined bend radius. The sweep comprises a first end that can be securely retained within an aperture of the guide and support member. The first end includes a first circumferential flange, a second circumferential flange and seat that extends between the flanges for receiving an inner surface of the aperture when the at least one end is retained within the aperture. In another embodiment, the sweep can include a set of spaced flanges at about its longitudinal midpoint for receiving an inner surface of the aperture.

The guide and the sweep according to the present invention permit flexible members, such as cables, to be pulled along a pathway using a minimum amount of force and causing a minimum amount of tension within the flexible member. As a result, these flexible members can be pulled at tension levels below the maximum permitted by building codes or recommended within the industry. One reason for this reduction in longitudinal stresses and tension within the longitudinal members is the reduction of friction along the pulling pathway. Unlike conventional conduits and cable trays, the guides and the sweeps reduce the amount of surface area in contact with the flexible member while maintaining recommended bending radii and providing a required amount of support during and after installation. The less surface area in contact with the flexible member, the less friction that will be applied to the flexible member and the less tension needed in the flexible member to overcome the friction and pull it along the pathway. Additionally, the support provided by the sweeps and the guide and support members eliminates sharp bends in the pathway and prevents kinks from forming along the pathway.

Another aspect of the present invention relates to a guide and support member (referred to as a "cradle") that can work with either or both the guide and sweep to guide, support and organize one or more flexible members while maintaining a prescribed minimum bend radius. The cradle includes a collar between its ends that can be securely retained within an aperture of a guide. The collar includes a first circumferential flange, a second circumferential flange and seat that extends between the flanges for receiving an inner surface of the aperture when the collar is retained within the aperture.

BRIEF DESCRIPTION OF THE FIGURES

FIG. 15 is a perspective view of an end of the sweep of FIG. 11;

FIG. 16 is a perspective view of another embodiment of a guide according to the present invention;

FIG. 17 is a perspective view of the guide shown in FIG. 16 being secured to a support surface;

DETAILED DESCRIPTION OF THE PREFERRED EMBODIMENT

Figure 1:
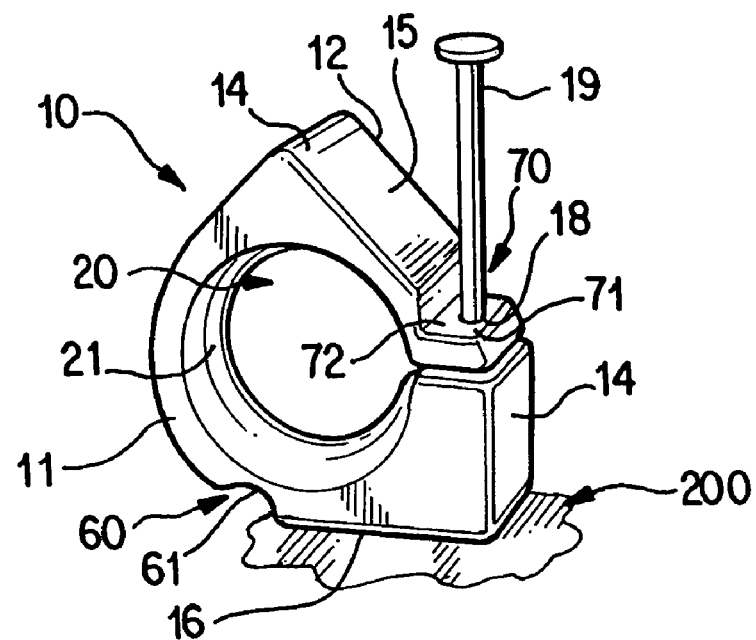
FIG. 1 is a perspective view of a guiding and support member according to the present invention with a fastening member for attaching the member to a support structure.

The present invention relates to a cable management system comprising a plurality of guiding and support members 10, 300, 300', 300" and 800 that can be used alone or together to provide support, guidance and organization to one or more flexible members 100 while maintaining the flexible member at a predetermined bend radius. The flexible members 100 (hereinafter referred to as "wires") can include wires and cables such as electrical cables for power, control and alarm, and telecommunication cables for voice, data and video. The use of the term "wires" to reference flexible members 100 should not be considered limiting as to the type of flexible member. Instead, it includes all types of known wires and cables. While not as preferred, the guide and supporting members 10, 300, 300', 300" and 800 can also guide and support flexible fluid carrying tubes or lines that bring gas, water or other fluids into a building. Although the present invention can be used with any of the above-mentioned elongated flexible members, for ease of explanation, the present invention will be discussed as it relates to guiding a wire 100 relative to a support surface 200 that is part of a free standing structure, an existing building or a building under construction. As discussed above, the support surface 200 can include a wall, a wall support, a stud or any other type of vertical support or surface. Additionally, the support 200 can include a horizontal surface such as a floor, a ceiling, a joist or a similar type of horizontal structure that wires are run along in either a straight run or around a corner.

The first guiding and supporting member 10 is hereinafter referred to as a "guide." As shown in FIG. 1, the guide 10 includes a pair of surfaces that form a first face 11 and a second face 12 that oppose each other. Each of these faces 11, 12 extends in a direction that is perpendicular to the direction that the wire 100 is fed through the guide 10. The guide 10 also includes side surfaces 14 that extend between the first and second faces 11, 12. The side surfaces 14 include at least one foot 15 for positioning on a support surface 200.

Figure 6:
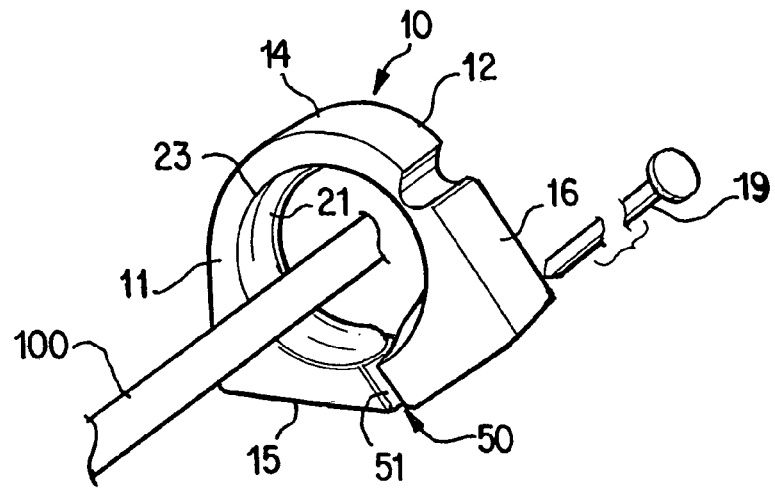
FIG. 6 is a perspective view of the guiding and support member of FIG. 4.

The foot 15 includes a passageway 18 having two ends for receiving a fastening member 19 such as a nail, screw or similar member. The fastening member 19 is driven or otherwise advanced into the support surface 200 for securing the guide to the support surface. The passageway 18 permits the fastening member 19 to be introduced and secured into the support surface 200 from either end so that the guide can assume the position shown in either FIGS. 1, 2 or FIG. 7A. Additionally, the passageway permits a screw to be used to secure the guide 10 to an additional attachment element such as a known beam clamp or a ceiling wire holder. The passageway 18 can be preformed in the guide 10 so that the angle of attack of the fastening member 19 is established. This may assist the installer when he is securing the guides 10 to the support 200. In an alternative embodiment shown in FIG. 6, the guide 10 does not include a passageway. Instead, a drill can be used to make an initial pilot (starting) hole or a through passageway that is smaller in diameter than the member 19 in the foot 15. However, by not including the passageway 18, the installer can introduce the fastening member 19 into the guide at any angle. This may offer the installer more installation possibilities.

Figure 2:
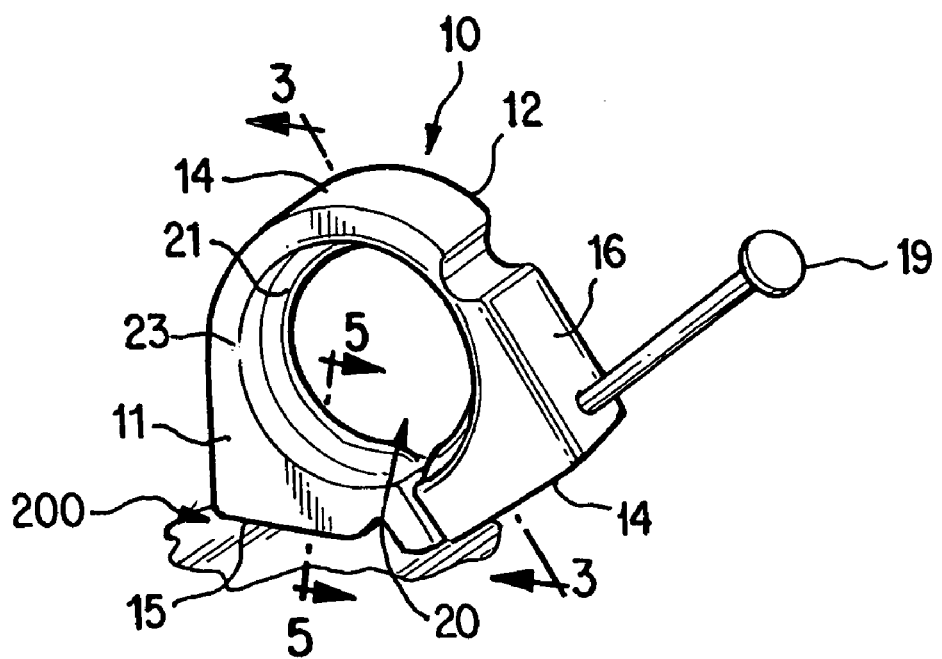
FIG. 2 is a perspective view of the guiding and support member according to the present invention with the fastening member in a different orientation relative to FIG. 1.
Figure 3:
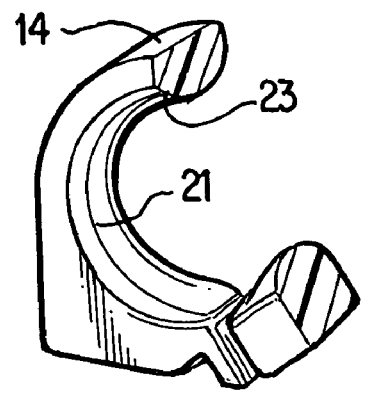
FIG. 3 is a cross-sectional view of the guiding and support member taken along lines 3-3 of FIG. 2.

As shown in FIG. 1, the foot 15 can include a neck 70 that forms a flattened region 71 through which the fastening member 19 is introduced by either positioning it in a passageway 18 that is preformed when the guide 10 is made or is drilled at the site by an installer. The neck 70 can be oriented relative to the sidewall of the side surfaces 14 of the guide 10 so that a desired axis of introduction for the fastening member 19 can be achieved relative to the support surface. For example, neck 70 permits the fastening member 19 to be advanced into the support surface 200 at a ninety-degree angle as shown in FIG. 1. However, as shown in FIG. 2, the fastening member 19 can also be introduced into the support surface 200 at an acute angle. This acute angle allows the fastening member 19 to be flushly secured to the support surface 200 even when the guide is used in tight spaces such as narrow vertical channels because one end (the head) will be able to engage an introduction of tools such as a hammer, drill or screwdriver. The neck 70 and flattened region 71 also provide a proper angle and a flat surface that allows the fastening member 19 to seat properly in the guide 10 and the support 200.

Figure 7A:
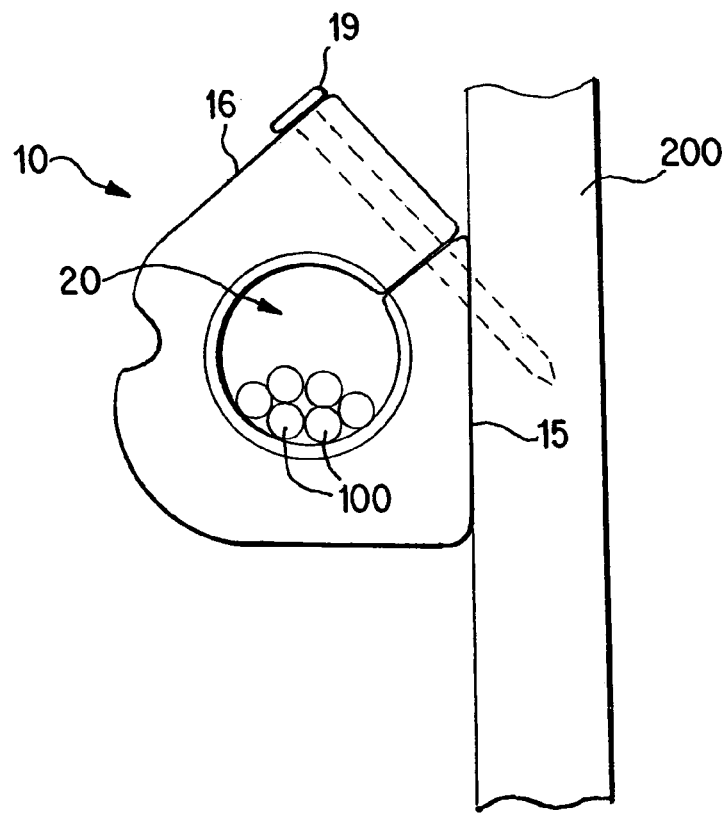
FIG. 7A is a schematic view of the guiding and support member of FIG. 4 secured to a support surface.

When the side surfaces 14 include two or more feet, each foot can include an opening to the passageway 18 for receiving the fastening member 19. In one embodiment, the first foot 15 and a second foot 16 extend along the side surfaces 14 of the guide 10. At least one of these feet 15, 16 contacts and is secured to one or more support surfaces 200 as shown in FIG. 7A. It is also possible that both feet 15, 16 contact a support surface 200 and that at least one of the feet is secured to one of the support surfaces by member 19. Other ways of securing the guide 10 could also be used. For example, a tie wrap(s) or strap(s) could be passed through an opening(s) in the guide 10 and then secured to the support structure(s) as discussed below with respect to FIGS. 8-10.

Figure 5A:
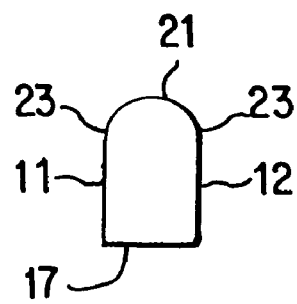
FIG. 5A is a cross section of the guiding and support member taken along lines 5-5 of FIGS. 1 and 4.
Figure 5B:
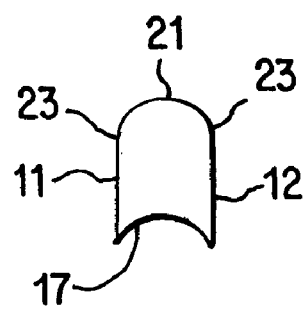
FIG. 5B is a cross section of an alternative guiding and support member taken along lines 5-5 of FIGS. 1 and 4.
Figure 7B:
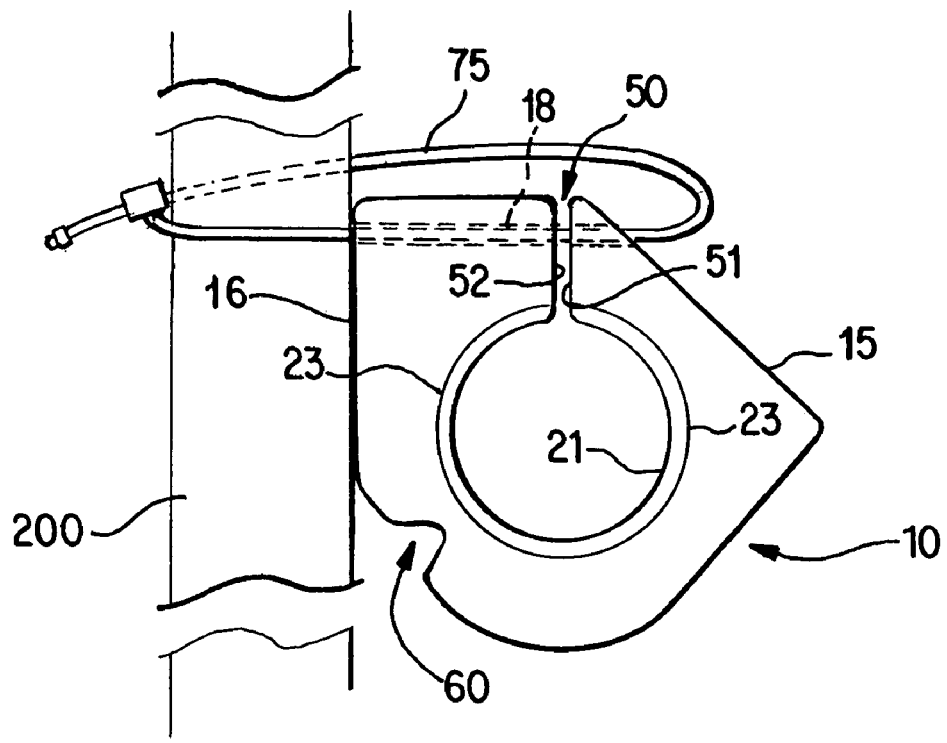
FIGS. 7B and 7C illustrate alternative closures for the guide and support member illustrated in FIG. 7A.

In one embodiment, shown in FIG. 7B, the tie wrap 75 could extend through passageway 18 and take the place of fastening member 19. In such an embodiment, the tie wrap could extend around or through the support 200. The feet 15, 16 extend at an angle to each other that permits the guide 10 to be positioned on any support surface 200 and in multiple orientations such as those shown in FIGS. 1, 2 and 7A. As a result, the feet 15, 16 allow the guide 10 to be oriented as needed so that it can be used on any support surface and at different orientations as shown in FIGS. 7A and 7B. In a preferred embodiment, the angle between the feet 15, 16 is about ninety degrees. As shown in FIG. 5A, each foot 15, 16 includes a flat, outer surface 17 that forms one of the side surfaces 14 of the guide 10. Alternatively, the surfaces 17 could be rounded or otherwise contoured to mate with its support surface 200 as shown in FIG. 5B.

Additional feet can also be included on the side surfaces 14. The angles between each of these feet can be between about thirty and ninety degrees. By providing the guide 10 with more than two feet, for example three to five feet, the number of positions and orientations at which the guide 10 can be positioned with respect to its support 200 and the direction from which the wire 100 is delivered can be increased.

The guide 10 also includes an internal aperture 20 that forms a passageway extending between the first and second faces 11, 12. The aperture 20 is defined by an inner circumferential surface 21 that forms a continuous surface between the faces 11 and 12. The inner surface 21 is convexly curved so that no sharp edges exist at the transition 23 between the faces 11, 12 and along the inner surface 21. Alternatively, the inner surface 21 can include multiple convex surfaces that are spaced from each other in a direction that extends between the faces 111 and 12. The convex contour of the inner surface 21 provides a smooth surface over which the wire 100 can be guided as it is pulled through the guide 10 and along a portion of the building. The inner support surface 21 will not damage the wire 10 as it is pulled or otherwise passed through it.

Figure 4:
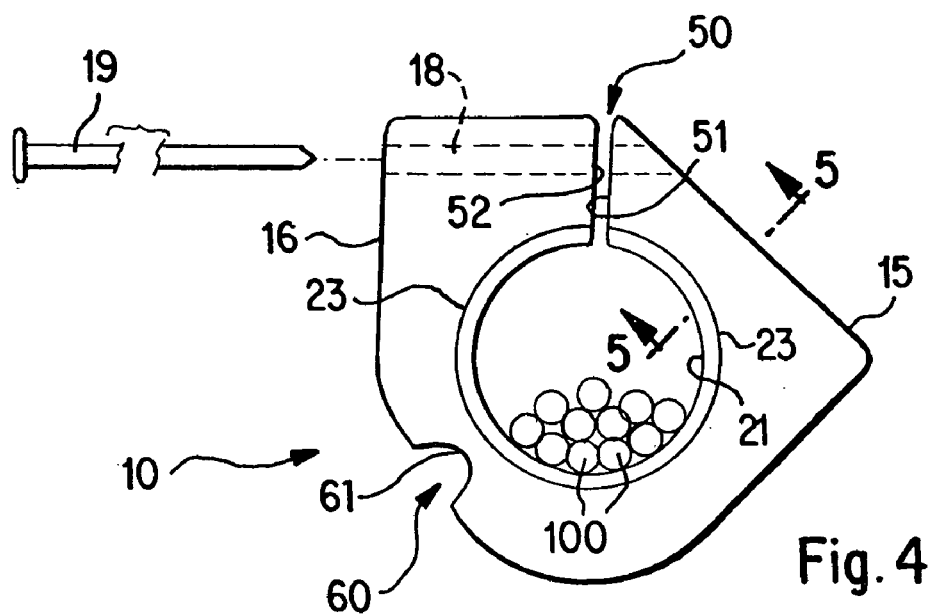
FIG. 4 is a schematic view of another embodiment of the guiding and support member according to the present invention.

As shown in FIG. 4, the guide 10 can also comprise an opening 50 that communicates with the aperture 20. The opening 50 extends between the outer side surfaces 14 of the guide 10 and the internal opening 20 for allowing the introduction of the wire 100 into the aperture 20 through the opening 50. The opening 50 is formed between a first opening face 51 and a second opening face 52. These faces 51 and 52 oppose each other on either side of the opening 50. When the faces 51 and 52 are forced away from each other, the guide 10 flexes at a hinge 60. As shown in the figures, the hinge 60 is positioned along one of the side surfaces 14 of the guide 10. The hinge 60 includes an area of reduced cross section 61 at which the guide 10 flexes. The reduced cross section 61 also provides a receiving area for a tie wrap (strap) that may be employed to secure the wire 100 or bundle of wires 100 to the guide 10. In this instance, the tie wrap will be positioned within the section 61 and secured around the wire(s) 100 so that the wire(s) 100 is/are held tightly against surface 21 and so that the guide 10 does not move (slip) relative to the wire(s) 100 as required by some codes.

Figure 7C:
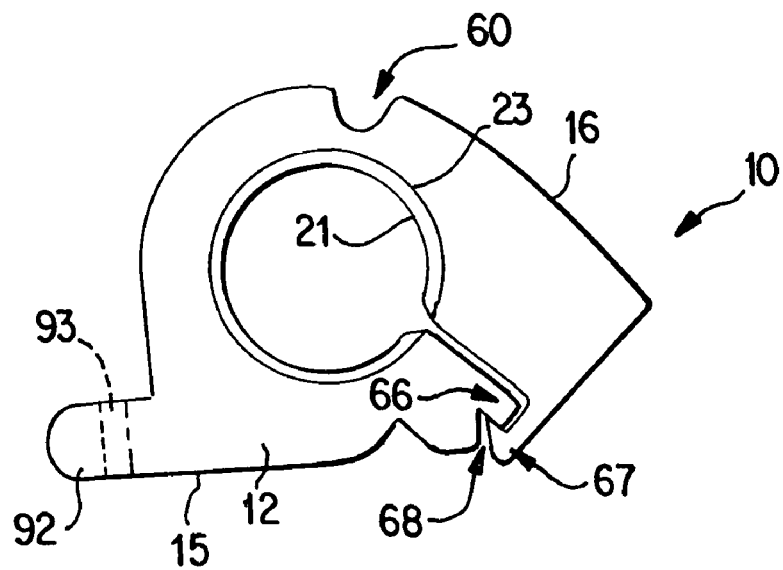

Other well known hinges can also be used to permit the faces 51, 52 to separate and return to their original position. These other hinges can include other well known resilient hinges that can be positioned on the interior or exterior of the guide 10. These hinges also include non-resilient hinges that include locking members positioned on either side of the opening 50 that cooperate to hold the guide 10 in a closed position. As illustrated in FIG. 7C, the guide 10 can include any flexible hinge 60 and cooperating lock members 66, 67 that provide a quick, snap fit closure 68 to securely lock the opening 50 closed.

FIGS. 16 and 17 illustrate an alternative embodiment of the guide 10. In this embodiment, the guide 10 includes the features of the guide 10 shown in FIG. 1 and it further includes an additional mounting member 92 that extends away from the sidewall 14. The mounting member 92 includes an opening 93 for receiving a fastening member 19 that is advanced into supporting structure 200 as shown in FIG. 17. The mounting member 92 provides the guide 10 with additional versatility. For example, it allows it to be mounted in additional orientations. Moreover, the guide 10 can be mounted without being closed. As a result, the guide 10 can be positioned over a previously installed wire 100 or wires 100 or wires 100 can be inserted into a pre-fastened guide 10.

Figure 8:
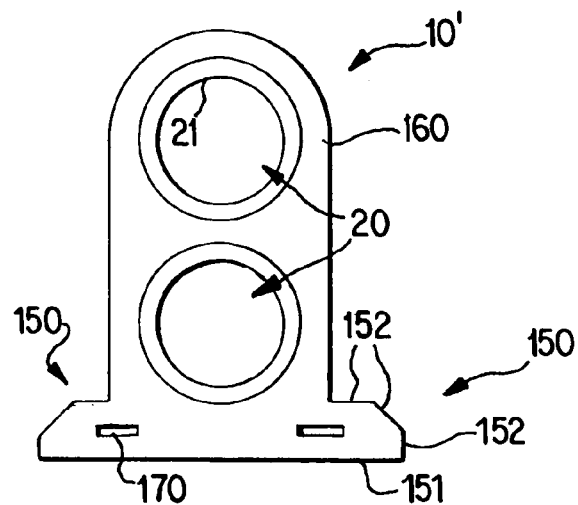
FIGS. 8-10 illustrate alternative embodiments of the guiding and support member according to the present invention.
Figure 9:
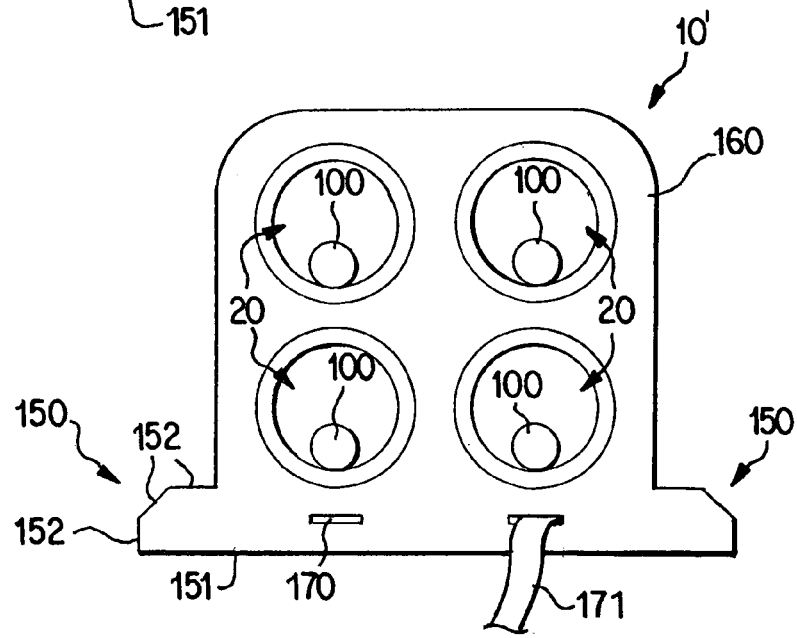
Figure 10:
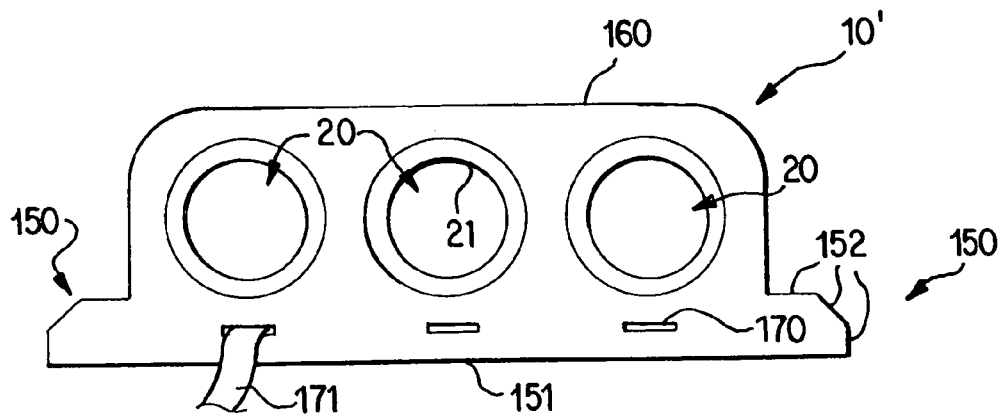

As shown in FIGS. 8-10, the present invention includes guides 10' that have a plurality of apertures 20 for receiving the wire 100. These guides 10' include between two and five apertures 20 that can be used to organize and support the wires 100. Each aperture 20 can be used to organize and/or separate wires or cables so that the flux generated by one set of wires does not interfere with another set of the wires. Similarly, the apertures 20 are used to separate different types of wires or different types of cables so that all of the same wires and cables can be included in the same aperture 20 for organization purposes. Any orientation of apertures 20, for example, the three apertures 20 could be staggered or the four apertures 20 could be in a diamond shape. However, additional apertures 20 can also be included. The apertures 20 are the same as those discussed above with respect to guide 10 so their discussion will not be repeated.

Each of the guides 10' includes a pair of feet 150 extending away from the main body 160 for contacting the support structure 200. The feet 150 can include a support structure contacting surface 151 that extends away from the main body 160. The contacting surface 151 is contoured to match the shape of the supporting structure 200 as discussed above with respect to guide 10. The surface 151 can be flat, convex, concave or any other shape that can match with the support structure 200. The feet 150 can also include a plurality of surfaces 152 that are able to receive a fastening member 19 for securing the guide 10' to the support structure 200. Multiple surfaces 152 are located on either side of the aperture 20. These surfaces 152 may or may not include a passageway 18. Each surface 152 is positioned at an angle relative to an adjacent surface 152 on one side of the guide 10' so that the fastening member 19 can be introduced into one of the surfaces 152 and the support structure 200 at any one of a plurality of angles relative to the support structure 200.

Each guide 10' (and possibly guides 10) also includes at least one slot 170 for receiving a tie wrap (strap) 171. These slots 170 permit a tie wrap 171 to be introduced into and through the guide 10'. The tie wrap 171 can be secured to a support surface to supplement the fastening members 19 or in place of the fastening members 19. Also, these slots 170 can receive tie wraps 171 that are secured about the wires 100 to prevent them from slipping with respect to the guides 10' as discussed above with respect to guides 10. The tie wraps 171 can also perform both of the above-discussed functions simultaneously.

All of the above-discussed embodiments of the guides can be formed of a hard, somewhat flexible material such as plastic. They should also be formed with sufficient size and thickness that they hold up to the pressures and stresses generated during wire pulling. One plastic that can be used for the guides is a polypropylene. A preferred polypropylene is FORTILENE PP TG 8801 or TG 6804 that are available from SOLVAY POLYMERS. However, any well-known polypropylene or plastic can be used.

Figure 11:
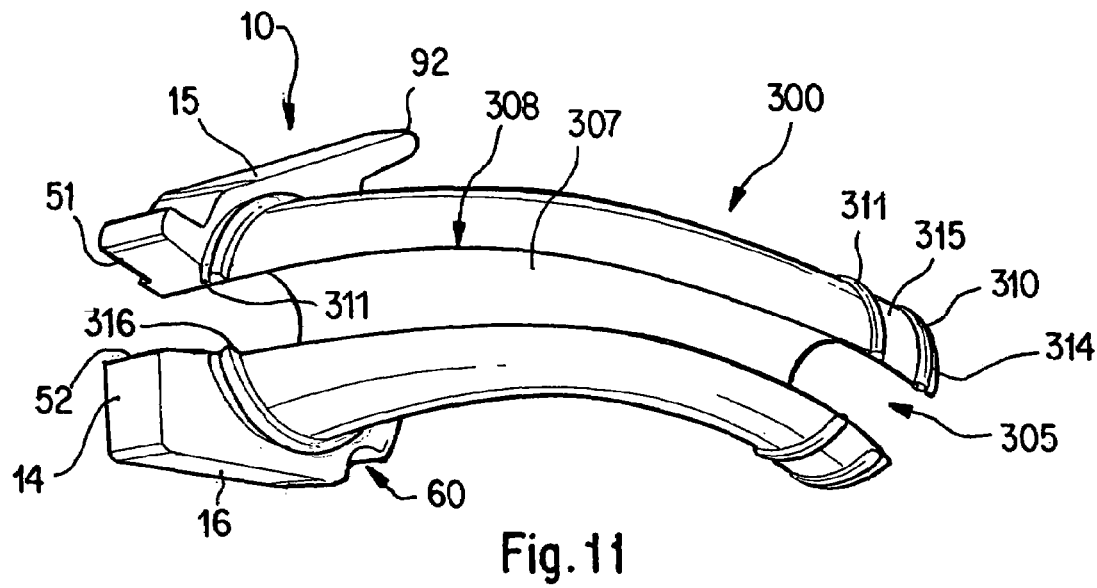
FIG. 11 is a schematic view of a sweep according to the present invention secured to a guide member according to the present invention.

In another embodiment illustrated in FIG. 11, the guide 10 is connected to a sweep 300. While sweep 300 will only be discussed as being connected to guide 10, it can also be connected to guide 10'. Therefore, the discussion of sweep 300 and guide 10 is equally applicable to sweep 300 and guide 10'. The sweep 300 is used in combination with the guide 10 to support the flexible wire 100 at a predetermined bend radius when it is static and when it is under a load as required by certain regional or national industry standards. An example is the above-mentioned standard for the installation of 4-pair UTP wire (category 5 or 6 cable—CAT 5 or CAT 6). For ease of explanation, the sweep 300 will be discussed with respect to category 5 cable. However, the sweep 300 is not limited to being used with only this type of wire. Instead, it can be used with any of the above-discussed flexible members.

As known, category 5 (CAT 5) cable has a frequency range of 100 MHZ and is good for high-speed data transfer. However, it is a highly engineered wire that can lose some of its desirable characteristics when it is not handled properly. As a result, new standards have been (are being) introduced that address the minimum bend radius of category 5 cable when static and in load conditions (when being pulled). The sweep 300 according to the present invention provides an angled bend that will support and retain the cable 100 at a predetermined bend radius that is required by these standards, for example about a two inch bend radius. However, other bend radii of between about one inch and about twenty-five inches may also be achieved. The specific bend radius and resulting bend of the sweep 300 will depend on the size and type of flexible member. In one embodiment of the invention, the sweep 300 provides a bending radius that causes an angle of between about five and about ninety degrees to be formed in the cable 100. In a more preferred embodiment, the angle provided by the sweep is between ten and sixty degrees. In another preferred embodiment, the angle is about fifteen degrees. In yet another preferred embodiment, the angle is about 45 degrees. In many situations, it is preferred that the angle be ninety degrees. As is well known in the art, a bend radius can be established by drawing a circle having the desired radius, for example a circle with a two inch radius if a two inch bend radius is needed, and placing one or more of the guides 10, 10' or sweeps 300 along the circumference of a quarter of the circle.

Figure 12:
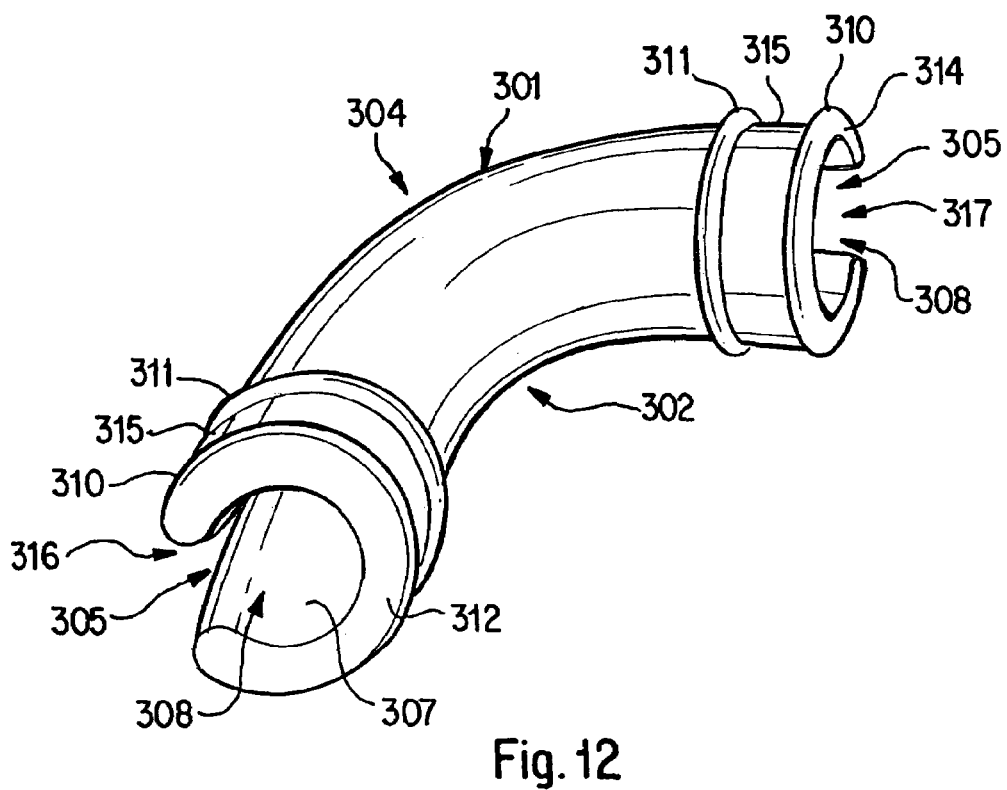
FIG. 12 is an end perspective view of the sweep shown in FIG. 11.
Figure 13:
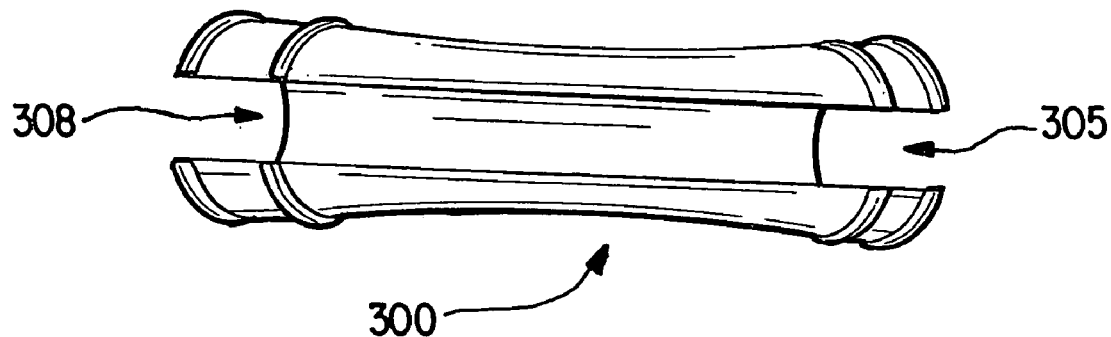
FIG. 13 is a schematic view of the sweep shown in FIG. 11.

FIG. 12 illustrates the sweep 300 that includes an elongated body 301 with a predetermined radius along a first side 302 and a second, larger radius along a second, longer side 304. The radius of sides 302 and 304 will change depending on the size of the sweep and the member being supported. The same is true of the inner and outer diameters of the sweep 300. The sweep 300 used with a single large wire or multiple wires that form a large bundle will have a large internal diameter that exceeds the wire or bundle diameter. In the alternative, a sweep 300 used with a thin wire or only a few wires may have a small internal diameter that is only slightly larger than the diameter of the cable or the small bundle so that it securely receives the wires. The outer diameter of each of these sweeps is sized to provide a needed amount of support to the carried cable.

While the sweep 300 is shown as having a substantially circular cross section, any cross section that can receive a wire 100 and not violate a regional building code or regulation can also be used. The sweep 300 has an outer opening 305 that extends through the wall (thickness) of the body 301 and along the length of the side 304. The opening 305 provides access to an inner passageway 308 that runs through about the center of the sweep 300 along its length. As seen in FIG. 12, the opening 305 is opposite a portion of an inner surface 307 of the passageway 308 that supports the wire 100 when the wire 100 is positioned at a minimum bend radius or is pulled through the sweep 300. However, the opening 305 could be positioned at any location around the circumference of the body 301. The opening 305 can be along either the major or minor curve of the sweep 300. However, it is not as preferred to position the opening 305 so that it extends through the body 301 and along the portion of inner surface 307 where the wire 100 is supported within the passageway 308. In an alternative embodiment, such as that shown in FIG. 18 with respect to sweep 300' (discussed below), the body 301 does not include the opening 305. Instead, the body 301 would be solid around its circumference and only include terminal openings 316, 317.

The opening 305 allows the sweep 300 to be used in a retrofit job to control the radius of an existing run of wire so that it will be at the required radius when static. This is accomplished by inserting the wire 100 into the passageway 308 through the opening 305 so that the wire 100 is located in central passageway 308 and supported by the inner surface 307 at the predetermined radius. The sweep 300 can then be slid along the wire 100 until it mates with the guide 10 as discussed below. The opening 305 extends along the entire length of the sweep 300 so that the sweep can be flexed into an open position in order to receive a large cable or a bundle of cables. The opening 305 also permits the outer diameter of the sweep 300 to be reduced so that it can be introduced into the guide 10 as discussed below.

The body 301 also includes a collar with spaced flanges 310, 311 at each of its terminal ends 312, 314. The flanges 310, 311 are formed of the same, substantially rigid, resilient material as the remainder of the sweep 300 and the guide 10 so that it holds its form and radius. In one embodiment, the sweep 300 is formed of a plastic. Other embodiments include the materials discussed above with respect to guide 10. A seat 315 extends between the flanges 310, 311 at each end 312, 314. The seat 315 can have the same outer diameter as the body 301. Alternatively, the seat 315 can have a reduced outer diameter. As seen in FIGS. 12-15, the flanges 310, 311 have a larger outer diameter than the seat 315. Additionally, the outer diameter of each flange 310, 311 is greater than the outer diameter of the body 301. As a result, the flanges 310, 311 form retaining walls on either side of the seat 315 for holding the sweep in the guide 10.

FIG. 11 illustrates a sweep 300 that is securely connected to the guide 10. The sweep 300 is secured to the guide 10 by forcing the collar with seat 315 through the opening 50 and then closing the opening as discussed above. This action of forcing the collar into the guide 10, 10' causes flexion of the hinge 60. Alternatively, the first flange 310 can be forced through the aperture 20 until the inner circumferential surface 21 is positioned in the seat 315. During the insertion of the guide 10, the flange 310 deflects slightly as it engages the circumferential surface 21 within the aperture 20. After the flange 310 snaps beyond the surface 21, it works with flange 311 to prevent movement and the premature, unintended withdrawal of the sweep 300 from the guide 10. The sweep 300 can also be secured within the aperture by adding an adhesive to the seat 315 or placing a clamp around the exterior of the guide 10 so that the clamp applies a closing pressure to both the guide 10 and the sweep 300. After the sweep 300 has been positioned in the aperture 20, the flange 310 is positioned against one of the faces 11, 12 of the guide 10 or against an outside surface of the inner circumferential surface 21. Alternatively, if the circumferential surface 21 does not extend completely from the face 11 to the face 12, the flange 310 will be located in the space between the end of the inner circumferential surface 21 and one of the faces 11, 12. In either instance, the flange 311 is on inner, on opposite sides of the inner circumferential surface 21 that is proximate the other terminal end of the sweep 300.

The sweeps 300 are one piece units that can be positioned over and free float along the length of a wire 100. This freedom of movement allows the sweeps 300 to be used in either new construction or to retrofit wires that have already been run. Also, in one embodiment, the sweep 300 can have one of its ends secured to the guide 10 and the other of its ends free from any connection so that it hangs from the guide 10 in a cantilevered manner. In another embodiment, one end of the sweep 300 is secured to the guide 10 and the other is secured to a hanger or other known tie so that this second end is supported, possibly independent of the guide 10. The sweep 300 can have any size and any bending radius (radii). The size and bending radius (radii) will depend on the size and type of wire being pulled (as mentioned above), the number of wires being supported and/or the regulated codes and standards for minimum radius requirements of various different wires.

Figure 18:
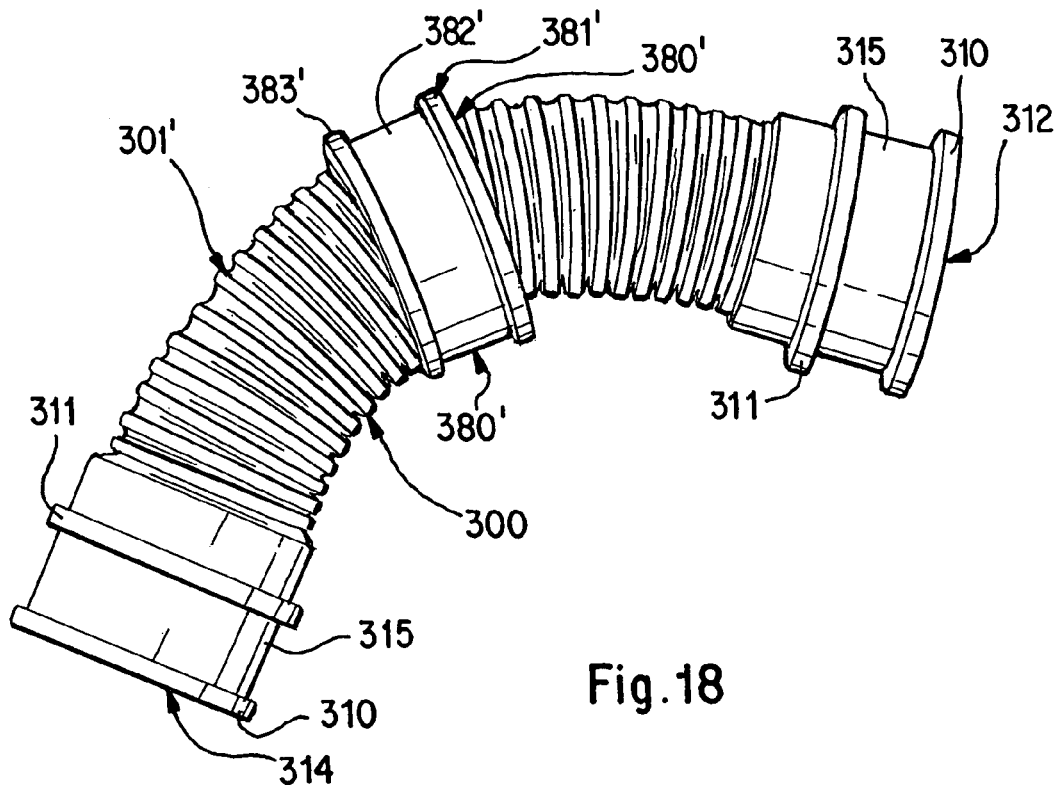
FIG. 18 illustrates another embodiment of a sweep according to the present invention.

FIG. 18 illustrates an alternative sweep 300' that includes a continuous body 301' without opening 305 (as discussed above) and a centrally positioned support member 380' spaced from its terminal ends 312, 314. The sweep 300' is very similar to sweep 300. For example, the sweep 300' holds the wire 100 at the angles and bend radii discussed above with regard to the sweep 300. As a result, for clarity, only the differences between the sweep 300 and the sweep 300' will be discussed.

Figure 19:
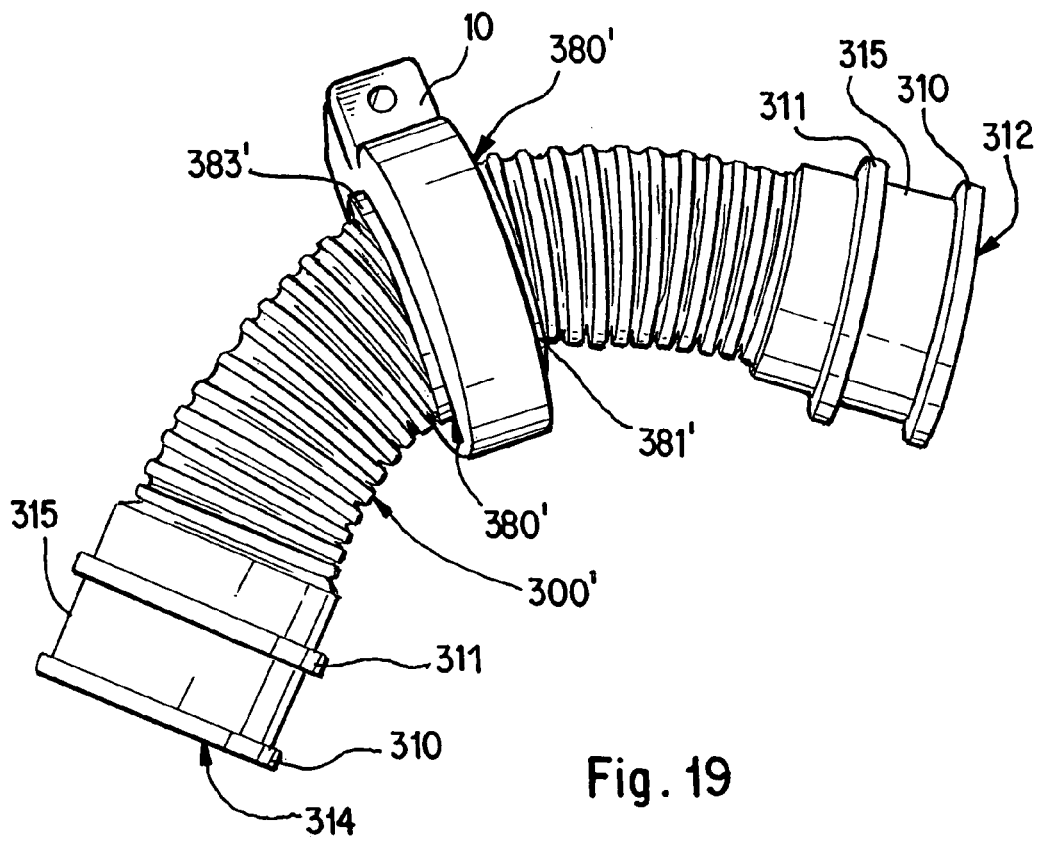
FIG. 19 illustrates the sweep of FIG. 18 secured within a guide according to the present invention.

In addition to the elements of the sweep 300, the sweep 300' includes the centrally positioned support member 380' (collar) that is comprised of a first flange 381', a second flange 383' and a seat 382' and, in a preferred embodiment, is positioned in the middle of the sweep 300'. As shown in the figures, the seat 382' extends between the flanges 381' and 383'. As shown in FIG. 19, the support member 380' is positioned within the hoop 10 in a similar manner to that discussed above with respect to the ends 312, 314 of the sweep 300. One of the flanges 381' and 383' is forced through the hoop 10 until the inner surface 21 is positioned between the flanges and positioned on the seat 382'. The support member 380' can be positioned at any location along the length of the sweep 300'. In a preferred embodiment, shown in FIGS. 18-19, the member 380' is positioned at the longitudinal center of the sweep 300'.

Figure 14:
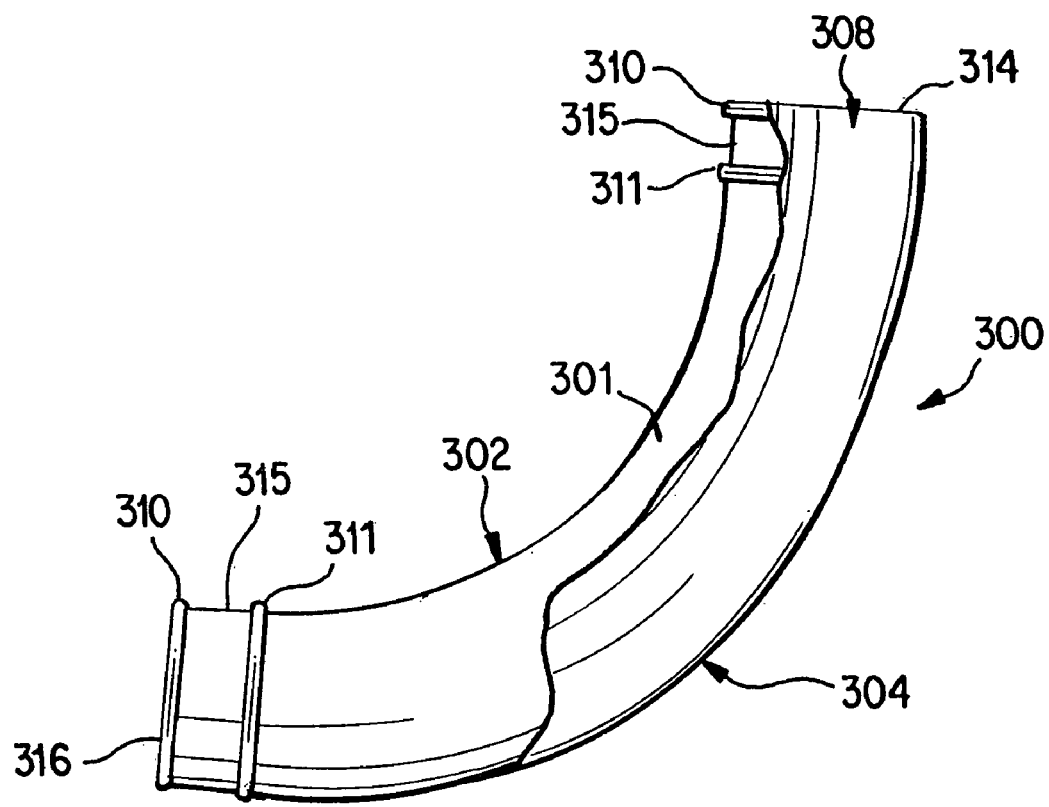
FIG. 14 is a partially broken away view of the sweep shown in FIG. 11.
Figure 20:
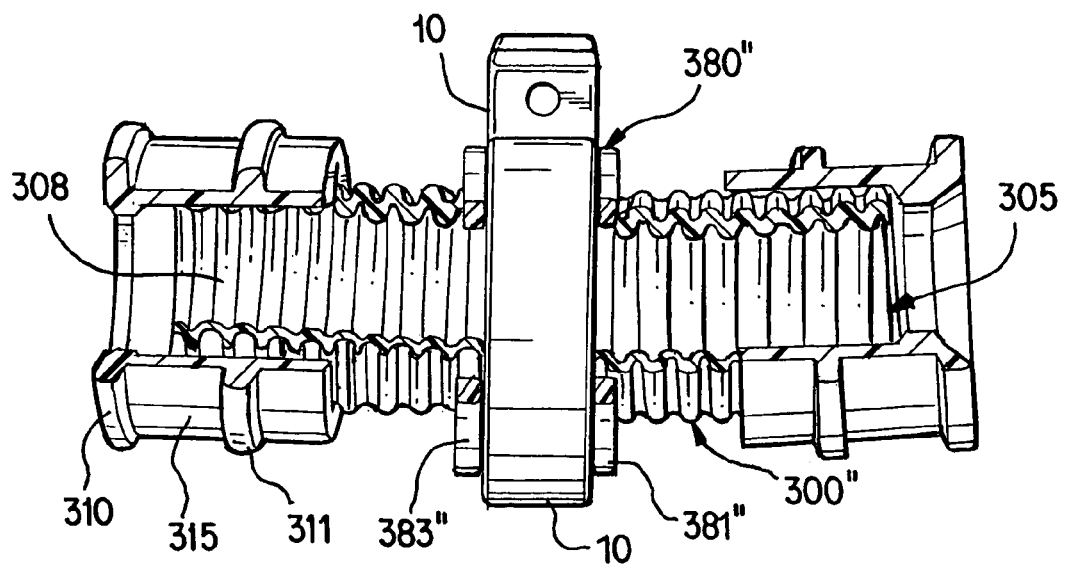
FIG. 20 illustrates another embodiment of a sweep attached to a guide and support member according to the present invention.

FIG. 20 illustrates alternative sweep 300", herein after referred to as a cradle 300". The cradle 300" is similar to sweep 300 discussed above, however, it also include one or more collars 380" that are spaced from the terminal ends 312, 314. Additionally, the cradle 300" holds the wire 100 at the angles and bend radii discussed above with regard to the sweep 300. However, in a preferred embodiment, the cradle 300" is curved at a smaller angle so that the bend in the wire 100 is softer than that experienced with the sweep 300. This can be clearly seen when FIGS. 14 and 20 are compared. For clarity, only the differences between the sweep 300 and the cradle 300" will be discussed.

As shown in FIG. 20, the collar 380" can be positioned in the center of the cradle 300" so that the cradle 300" extends and maintains a minimum bend radius on both sides of guide 10 to provide the wire 100 with additional support and prevent kinking of the wire 100 on both sides of the guide 10 while and after the wire 100 has been hung. Cradle 300" includes longitudinal opening 305 as discussed above with respect to sweep 300.

In addition to the elements of the sweep 300, the cradle 300" includes a centrally positioned support member 380" (collar) that is comprised of a first flange 381", a second flange 383" and a seat 382" and, in a preferred embodiment, is positioned in the middle of the cradle 300". As shown in the figures, the seat 382" extends between the flanges 381" and 383". As shown in FIGS. 19-20, the support member 380" is positioned within the hoop 10 in a similar manner to that discussed above with respect to the ends 312, 314 of the sweep 300. One of the flanges 381" and 383" is forced through the hoop 10 until the inner surface 21 is positioned between the flanges and positioned on the seat 382". The support member 380" can be positioned at any location along the length of the cradle 300". In a preferred embodiment, shown in FIGS. 18-19, the member 380" is positioned at the longitudinal center of the cradle 300".

The cradle 300" positions and maintains the wire 100 at the same bend angles discussed above with respect to sweep 300. For example, in one embodiment, the cradle 300" has a bending radius that holds the wire 100 at bend angles of about fifteen degrees on both or either side of the guide 10. In an alternative embodiment, the cradle 300" could be completely linear without any bend.

Figure 21:
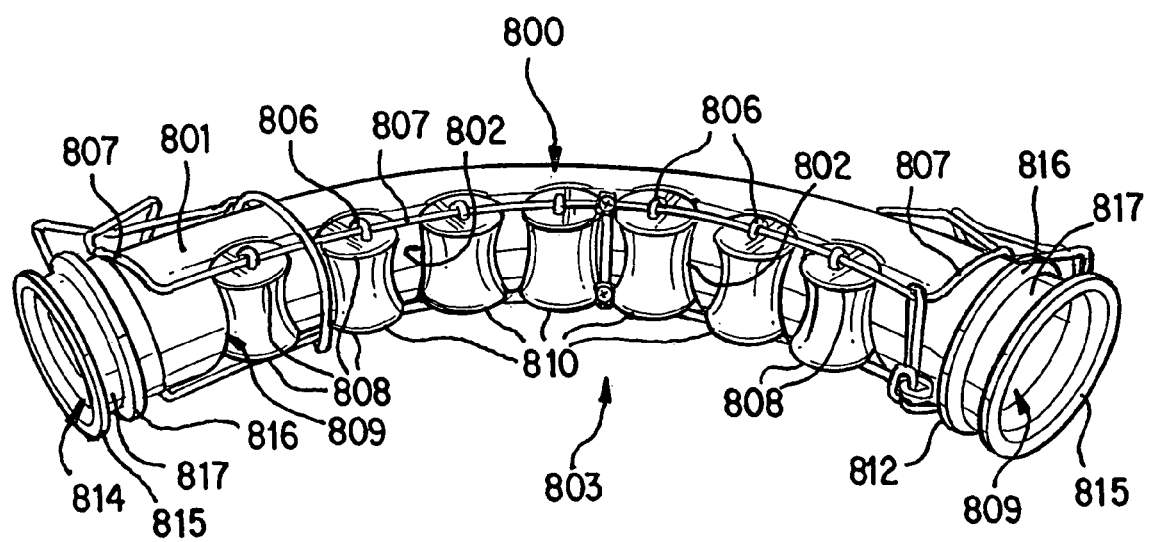
FIG. 21 is a perspective view of a roller sweep according to the present invention.
Figure 22:
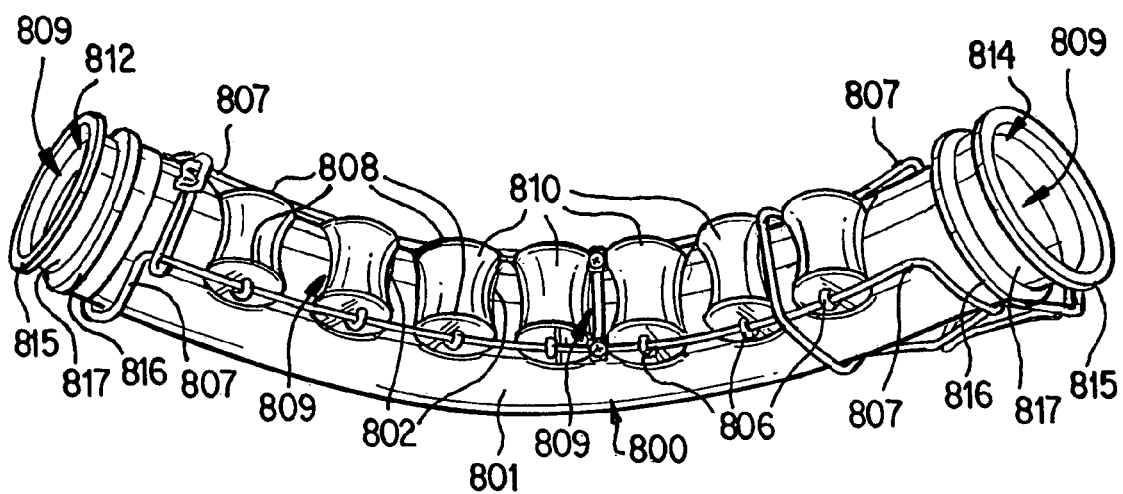
FIG. 22 is another perspective view of the roller sweep according to the present invention.

Another embodiment of a sweep is illustrated in FIG. 21. In this embodiment, a sweep 800 includes rollers 810 that further reduce the amount of friction experienced by the wire 100 while it is pulled along the pathway so that the wire 100 will not be damaged as a result of excessive stretching. In one embodiment, the sweep 800 is positioned at a corner in the pathway to assist in pulling the wire 100 around the corner and thereby eliminates the stresses conventionally experienced by a wire when pulled around a corner. However, the sweep 800 does not always need to be positioned at a corner, instead, it can also be used at positions along the pathway that are spaced from corners when the sweeps 800 includes a less than ninety degree bend, for example it could only have a five degree bend. As seen in FIGS. 21 and 22, the sweep 800 is similar to sweeps 300, 300' and cradle 300". For example, it can include central passage 809 and ends 812, 814 that comprise spaced flanges 815, 816 and a seat 817 extending between the flanges (as discussed above with respect to the sweeps 300, 300' and cradle 300") for securing the sweep 800 to any one of the guide members. Additionally, the sweep 800 could include one or more of the above-discussed support members such as member 380' or 380" that could be positioned at any position along the length of the sweep 800 that is spaced from the ends 812, 814, such as the middle of the sweep 800. Moreover, the sweep 800 could include a longitudinal opening similar to opening 305. The differences between sweeps 300, 300', 300" and sweep 800 will be discussed below.

As seen in FIGS. 21 and 22, the sweep 800 (also referred to as a "roller sweep") includes an elongated body 801 and at least one opening 802 along its smaller (inner) curved section 803. While plural openings are shown in the figures, the sweep 800 may include only one. The openings 802 each receive a roller 810 that is secured against translational movement along the body 801 by a frame 807. Each roller 810 rotates relative to the body 801 within its respective opening 802. As shown in FIG. 22, the rollers 810 are each supported by an axis 806 of the frame 807 that extends around the body 801. In an alternative embodiment, the rollers 810 are each supported by an axis that is received within the body 801. In either embodiment, the rollers 810 can include an inner bearing surface that allows the rollers 810 to rotate around their support axes. Alternatively, the rollers 810 are secured to their axes and terminal ends of the axes are rotatably secured within bearings in the support frame 807 or the body 801 so that the axes and the rollers 810 rotate relative to the body 801 as the wire 100 is pulled through the sweep 800.

As illustrated in FIG. 22, each roller 810 can include a pair of spaced flanges 808 that keep the cable 100 aligned and centered and in the pathway as it is pulled across the rollers 810. Even though it is not illustrated, the rollers 810 can each include a groove in its outer circumferential surface for receiving the cable 100. The groove will aid in the alignment of the cable within the sweep 800.

The present invention also includes a method for feeding and guiding the wire 100 along a length of a building so that the building can be easily wired. More particularly, the method includes a method for feeding and guiding a wire 100 along a wall and around a corner of the building in order to wire a building. The present invention includes the steps of orienting the guide and support members 10, 10', 300-300" in a particular position relative to the support structure 200 and securing these members 10, 10', 300-300" and 800 to support structures 200 in the desired orientation. The guides 10, 10' and the sweep 300 can be positioned at a corner of the structure and, if desired, along the length of the structure as a cradle. By itself or after receiving a sweep 300, 300', 800 or cradle 300", the guide 10, 10' is secured by advancing a nail or other type of fastening member 19 into the foot 15, 150 and into the support structure 200. The wire 100, sweep 300, 300', 800 or cradle 300" is inserted into one of the apertures 20 by flexing the hung guide 10, 10' about the hinge 60 so that the faces 51 and 52 are spread apart. The wire 100, sweep collar or cradle collar is then inserted into the aperture 20 through the opening 50. Alternatively, the wire 100 can be passed directly through the aperture 20 by advancing it directly into the aperture 20. Similarly, the sweep collar and cradle collars could be snap fitted in the guide 10, 10'.

Once the wire 100, sweep 300, 300', 800 or cradle 300" is positioned in the aperture 20 of one or more guide 10, 10', the wire 100 can be easily pulled through the hung guide and support members from its original location to its final location by a single person. This eliminates the need for a person to double back along the length of the wire to pull it until it gathers at a particular location, such as a corner, until enough wire 100 has been gathered to make it to the next corner or other predetermined location along the structure. Also, the wire 100 can be pulled along the length of the structure without having to bunch the wire 100 at any location along the length of the structure being wired and while supporting the wire 100 at a predetermined bend radius. Additionally, the method can include positioning a guide 10, 10' at each corner of the structure so that the wire can be pulled around more than one corner at a time.

The present invention also includes a method of organizing unorganized wires that have already been installed in a building or that are hanging from a desk, computer support surface, table or the like. In this method, the guide is opened up so that it flexes about the hinge 60. The guide (and sweep or cradle if needed) is then positioned over the existing wires and closed. The installer will then orient the guide to a support structure 200 by positioning one of the feet along a surface of the support structure or an adjacent structure and secure it accordingly using a member 19 or a tie strap. Alternatively, the guide 10, 10' can be secured to the support surface before the wires are introduced into the aperture 20. In this embodiment, the wires 100 and/or the opening 50 may be secured after the wires have been inserted.

It is understood, of course, that while the forms of the invention herein shown and described include the best mode contemplated for carrying out the present invention, they are not intended to illustrate all possible forms thereof. For example, the guides could have push-in clips (1) at their feet, (2) in place of their feet or (3) spaced from their feet that permit the guides to be directly secured to an interior or exterior surface of an electrical panel. Similarly, tie straps could be used to close the openings to the guide members 10, 10'. Additionally, the guides could include brackets for holding them within a wiring panel. Moreover, the body of any of the above-discussed sweeps can be formed of a corrugated tube. Also, each of the guides, sweeps and cradles can be used together as a system and placed strategically along the wire path for supporting the wire and making the act of pulling wire easy and less stressful on the wire so as to reduce the damage that could be experienced by the wire without the present invention. It will also be understood that the words used are descriptive rather than limiting, and that various changes may be made without departing from the spirit or scope of the invention as claimed below.

I claim:

1. A sweep for maintaining a flexible member at a predetermined radius, said sweep comprising an elongated tubular body including a plurality of rollers spaced along its length, a passageway and first and second ends for being securely retained within an aperture of a respective guide, said first and second ends each including a collar having a first circumferential flange, a second circumferential flange and a seat extending between said flanges for removably receiving a portion of the respective guide.

2. The sweep according to claim 1, wherein the rollers are provided with a frame.

3. The sweep according to claim 1, wherein the body and collar form of a one piece construction.

* * * * *